June 9, 1964     R. H. HARDING     3,136,566
TRACTOR SEMITRAILER LOAD DISTRIBUTOR DEVICE
Filed Jan. 11, 1963
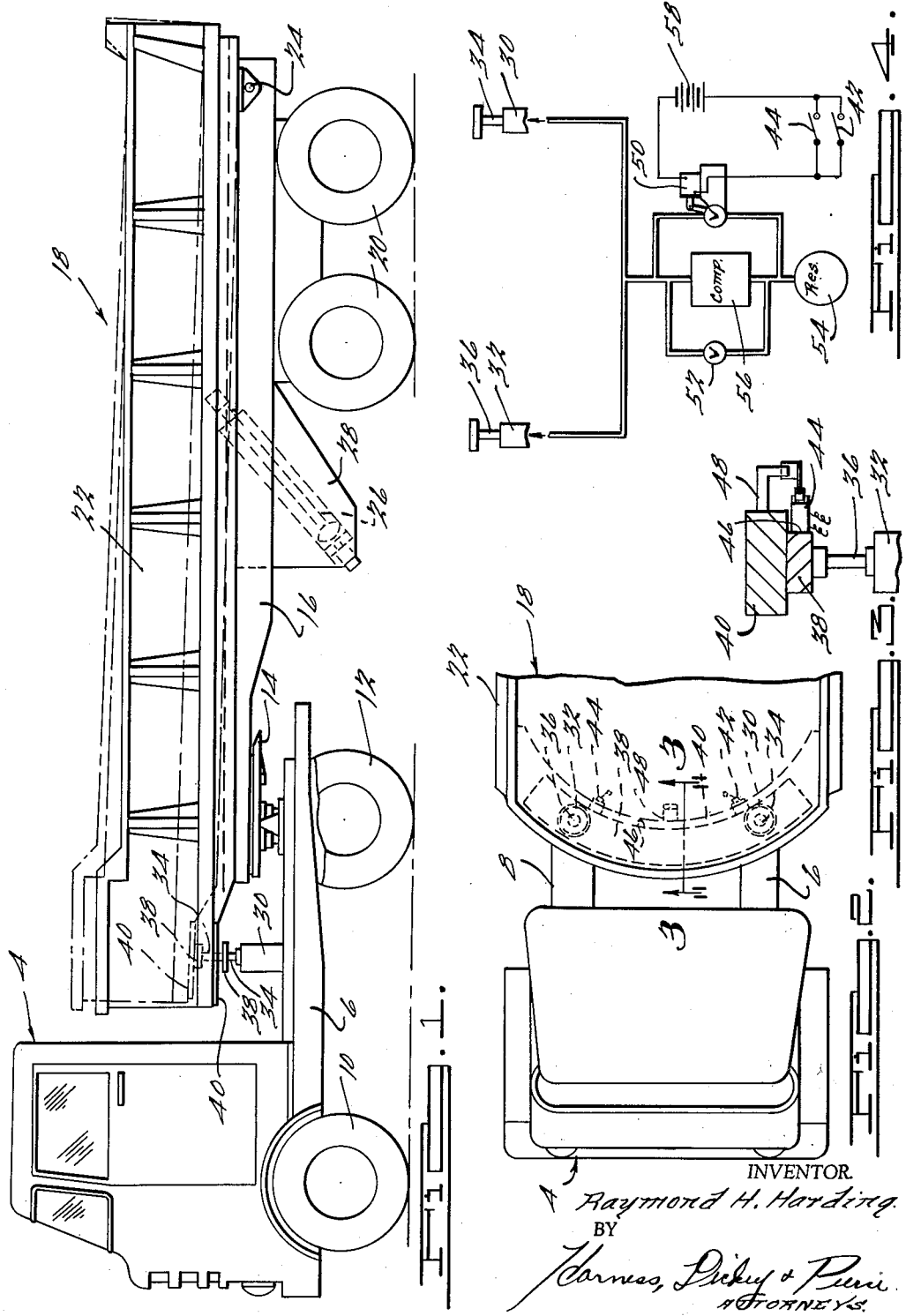
INVENTOR.
Raymond H. Harding.
BY
Carnes, Dickey & Pierce
ATTORNEYS.

United States Patent Office 3,136,566
Patented June 9, 1964

3,136,566
TRACTOR SEMITRAILER LOAD DISTRIBUTOR DEVICE
Raymond H. Harding, 718 15th St., Tell City, Ind.
Filed Jan. 11, 1963, Ser. No. 250,854
6 Claims. (Cl. 280—405)

The present invention broadly relates to a load distribution device for tractor and semitrailer units and more particularly, to a load distribution device incorporating a safety mechanism mounted on a tractor adapted to engage the dump box of a dump type semitrailer for effecting a shift of a portion of the load from the rear wheels to the front wheels of the tractor. This application is a continuation-in-part of the applicant's copending application Serial No. 28,579, filed May 12, 1960 and now abandoned.

The continuous improvement in the quantity and quality of public highways and the increased volume of goods transported thereover by a wide variety of vehicles has prompted nearly all of the states and many municipalities to enact laws regulating the lengths, types of load, and axle loading of transport vehicles to prevent crushing, cracking or otherwise damaging the surfaces of highways and streets. Because of these regulations, a truck operator engaged in long distance hauling frequently is subjected to conforming with length and axle loading vehicular regulations which vary in allowable limits necessitating either a reshuffling of cargo or operating at less than full capacity to assure conformance with the laws and avoid damage to the highway surfaces. Similar problems also arise in short distance hauling wherein the nature of the goods transported will cause variations in the distribution of the load between the axles and wheels of the transporting vehicle.

It has been the practice, in load distribution devices heretofore known and used, to either adjustably mount the fifth wheel on the tractor to enable longitudinal shifting thereof to effect a variation in the load distribution between the front and rear wheels of a tractor, or to employ some type of lifting or elevating mechanism to distribute a portion of the load on the rear wheels of the tractor to the front wheels and thereby reduce the load on the rear wheels to conform with prescribed regulations. The use of such systems, however, has been limited due to regulatory acts which encompass variations in the wheel base dimensions of semitrailer trucks, and secondly, to the potential danger of the tractor and trailer jackknifing or "sliding out" upon deceleration while traversing a roadway having either a relatively slippery surface or substantially sharp turns. Furthermore, it is known that by distributing a proportionately greater load to the front or direction controlling wheels of a tractor, the difficulty in reorienting the tractor and trailer to an in-line relationship upon traversing the slippery or curved portion of roadway is substantially increased.

Accordingly, the present invention is directed towards a novel load distribution device comprising an elevating mechanism of the aforementioned description but having in operative association, a safety means that effects a redistribution of the weight apportioned to the front wheels of the tractor back to the rear wheels upon a pivoting of the tractor with respect to the trailer beyond a preselected angularity. Consequently, the tendency of the tractor and trailer to jackknife is greatly reduced and the vehicle operator is given addition operative control of the tractor and trailer while traversing highways having relatively hazardous surface conditions.

It is accordingly a primary object of the present invention to provide an improved load distribution mechanism applicable to dump type semitrailer trucks whereby the load distribution between the rear and front wheels of the tractor can be varied to conform both with prescribed transportation regulations and also with hazardous highway conditions.

Another object of this invention is to provide a load distribution mechanism of simple design, durable operation, and which is readily adaptable for installation on tractors employed in hauling dump type semitrailers.

Another object of this invention is to provide an improved load distribution mechanism adapted to engage the forward end of the dump box so as to relieve a portion of the load on the fifth wheel thereby causing a shift of the load from the rear wheels of the tractor to the front wheels.

Still another object of this invention is to provide an improved load distribution mechanism employing means therein for de-energizing the load distribution mechanism upon a change in direction of the tractor with respect to the trailer beyond a preselected angularity and which subsequently re-energizes the load distribution mechanism at such time as the tractor and trailer are reoriented in a relatively in-line configuration.

Other objects and advantages of the present invention will become apparent from the following detailed description taken in conjunction with the accompanying drawings, wherein:

FIGURE 1 is a side elevation view of a tractor and dump type semitrailer incorporating therein a load distribution mechanism according to a preferred embodiment of this invention and illustrating in phantom the dump box in the raised position;

FIGURE 2 is a fragmentary plan view of the tractor and forward portion of the dump type semitrailer shown in FIGURE 1 showing in particular the relative positions of the fluid actuable lift cylinders and safety mechanism limit switches of the present invention with respect to the forward end portion of the dump box;

FIGURE 3 is a fragmentary vertical sectional view of the limit switch and actuating bracket as shown in FIGURE 2 and taken along the line 3—3 thereof; and FIGURE 4 is a diagrammatic illustration of the electrical and hydraulic circuits utilized in a preferred embodiment of the load distribution device of the present invention.

Referring now in detail to the drawings, a typical tractor and dump type semitrailer unit to which the present invention is applicable, is comprised of a tractor 4 including a frame comprising longitudinal side frame members 6 and 8 respectively, on which front wheels 10 and rear wheels 12 are rotatably supported. The rear wheel 12 is partly cut away in FIGURE 1 for clarity. A fifth wheel assembly 14 is affixed to the rearward portions of side frame members 6 and 8 for pivotally supporting and connecting the forward portion of a structural framework 16 of a dump type semitrailer 18. The semitrailer 18 is provided with a pair of rear wheels 20 disposed in a tandem relationship which are rotatably supported on suitable axles affixed to the rearward portions of the framework 16. A dump box 22 is hingedly mounted at the rearward portion thereof on the framework 16 by means of a rugged hinge assembly 24. When the dump box 22 is in the lowered position it is supported on and cradled between the underlying structural framework 16 which in turn transmits the load contained therein to the rear wheels 20 and fifth wheel assembly 14. Raising of the dump box 22 to a dumping position by rotating it about hinge assembly 24 can be achieved for example, by a suitable lift cylinder assembly 26 shown in dotted lines in FIGURE 1 which is mounted on side shields 28 affixed to the underside of framework 16 and having the end of the piston rod portion thereof connected to the underside of the dump box 22.

When the dump box 22 is fully loaded the load contained therein is supported primarily by the rear wheels 20 of the semi-trailer and the rear wheels 12 of the tractor by virtue of the fifth wheel assembly 14 connection disposed substantially over the rear axle of the tractor. As frequently occurs, the rear wheels 12 of the tractor become excessively loaded whereby they exceed the load limit permissible by the applicable highway regulation whereas the front wheels 10 of the tractor are relatively lightly loaded and are substantially below the load limit prescribed by the applicable highway regulation. Under such conditions, it is possible by use of the novel load distribution mechanism comprising the present invention, to effect a shifting of a portion of the load on the rear wheels 12 to the front wheels 10 of the tractor thereby reducing the load on the rear wheels 12 to within the prescribed limits obviating the necessity of manually shifting the load in the dump box 22, discharging a portion thereof, or obtaining an overload permit while concurrently lessening the possibilities of damage to the highway surfaces.

A preferred embodiment of the load distribution mechanism employed in the present invention is shown in the drawings and comprises a pair of transversely spaced lifting cylinders 30, 32 mounted on the tractor side frame members 6 and 8, respectively, and which lifting cylinders are positioned forwardly of the fifth wheel assembly 14 and intermediate the front wheels 10 and rear wheels 12 of the tractor. The lift cylinders 30, 32, which consist of suitable fluid actuated cylinders, can be fixedly mounted to the side frame members 6 and 8, respectively, or can be resiliently mounted so as to absorb shock loading imposed thereon during movement of the tractor over irregular terrain. It is also contemplated that the lift cylinders 30, 32 may be mounted on suitable slide assemblies affixed to the frame members 6 and 8 enabling concurrent longitudinal movement of the lift cylinders relative to the tractor frame and fifth wheel facilitating adaptation thereof to different dump type semi-trailers.

Each of the lift cylinders 30, 32 as shown in the drawings, include a piston and rod assembly 34, 36, respectively, which are reciprocable to and from a raised position and a lowered position. A lifting pad 38 is connected to the upper end portions of the piston and rod assemblies 34 and 36 and extends transversely between the lift cylinders 30, 32. The lifting pad 38 is adapted to slidably engage a suitable pressure pad 40 affixed to the underside of the forward portion of the dump box 22. The lifting pad 38 and the pressure pad 40 are preferably of an arcuate configuration as shown in FIGURE 2 providing continuous support of the dump box when in the raised position as the semitrailer pivots about the fifth wheel assembly 14. The contacting surfaces of the lifting pad 38 and the pressure pad 40 can be coated with a suitable lubricant similar to that employed between the mating surfaces of the fifth wheel assembly 14 for minimizing the friction therebetween. It is also contemplated that the upper surface of the lifting pad 38 and/or the lower surface of the pressure pad 40 may be provided with suitable antifriction members such as rollers or ball bearings, for example, for minimizing frictional forces during relative movement thereof.

It has been found that under normal loading conditions, the tractor and trailer become generally unstable and their tendency to jackknife substantially increases upon the traversing of a relatively slippery or curved portion of roadway which results in a pivoting of the tractor 4 with respect to the trailer 18 of an excessive angularity.

Accordingly, in a preferred embodiment of the present invention, a safety means comprising suitable sensing means such as a pair of mechanically actuated limit switches 42 and 44, which are operable to effect de-energization of the lift cylinders 30 and 32, is utilized to reapportion the weight on the lift mechanism back to the fifth wheel assembly 14 at such time as the tractor 4 and the trailer 18 tend to become oriented in a relatively unstable condition.

As best seen in FIGURES 2 and 3 of the drawings, the limit switches 42 and 44 are transversely mounted to a rear surface 46 of the lifting pad 38 and are actuated by the engagement of a suitable tripping means such as a generally L-shaped bracket 48 which extends rearwardly of the pressure pad 40. During normal in-line transport operation, the bracket 48 is oriented substantially interjacent of the limit switches 42 and 44, but upon a pivoting of the tractor 4 with respect to the trailer 18 beyond an excessive angularity, such as an angle greater than 20–25 degrees, for example, the bracket 48 engages and activates the appropriate limit switch 42, 44. Upon actuation of the limit switch 42, 44, the electrical circuit as shown in FIGURE 4 of the drawings, is completed resulting in the biasing of a solenoid trip valve 50 to the open position to substantially alleviate the fluid pressure in the hydraulic system and de-energize the lift cylinders 30 and 32.

It should be noted that the degree of pivoting of the tractor 4 with respect to the trailer 18 where the tendency of jackknifing becomes acute varies directly with the instant loading condition of the trailer 18. Accordingly, it is contemplated that the limit switches 42 and 44 can be adjustably mounted on the lifting pad 38 or the bracket 48 can be adjustably mounted on the pressure pad 40 to enable a transverse shifting thereof to correspond with the loading conditions of the trailer 18.

Upon substantially complete traversing of the aforementioned slippery or curved roadway, where the tractor 4 and trailer 18 pivot toward a normal in-line configuration, the pressure pad 40 is pivoted in a reverse direction upon the lifting pad 38 wherein the bracket 48 re-engages the limit switch 42, 44 to effect the actuation thereof and re-energization of the lift cylinders 30 and 32 to reapportion the weight on the fifth wheel assembly 14 back to the lift mechanism as previously described.

A second solenoid check valve 52 disposed in the electro-hydraulic circuit shown in FIGURE 4 of the drawings is preferably operable through suitable remote controls to allow manual energization of the lift mechanisms as directed by the tractor operator.

The pressurized fluid such as air and preferably hydraulic fluid, utilized in actuating the lift cylinders 30, 32, is best supplied from a common central source 54 that supplies pressurized fluid to the dump box lift cylinder assembly 26. A continuous fluid pressure is preferably supplied to the lift cylinders 30 and 32 when in the raised position, as by a suitable fluid compressor 56, to make up for any seepage of the fluid that may occur around the piston slidably disposed in the cylinder. A suitable power source 58, as indicated in FIGURE 4 of the drawings, can be adequately supplied by the standard electrical system utilized by the tractor 4.

At such time as the lift cylinders 30, 32 are in the lowered position, for example, when the trailer is in a relatively unloaded condition, the dump box 22 is substantially supported along its entire length by the framework 16 of the semitrailer as shown in the solid lines in FIGURE 1. In that position, the piston and rod assemblies 34, 36 are retracted in the cylinders 30, 32 and the lifting pad 38 connected to the upper ends thereof is disposed below and out of sliding contact with the pressure pad 40 at the forward end of the dump box 22. When it is desired to effect a shift of a portion of the load from the rear wheels 12 to the front wheels 10 of the tractor, the lift cylinders 30, 32 are elevated by actuation of the solenoid trip valve 52 causing the lifting pad 38 to engage the pressure pad 40 lifting the dump box to a raised position as shown in phantom in FIGURE 1. In the raised position, the dump box 22 is supported at the rearward portion thereof on hinge assemblies 24 and at the forward portion by the lifting pad 38 connected to the lift cylinders 30, 32. Accordingly, the load contained in the dump box 22 which formerly was concentrated at the rear wheels 20 of the semitrailer and at the fifth wheel assembly 14 is now concentrated at the rear wheels 20 and at a point intermediate the front wheels 10 and rear wheels 12 of the tractor as determined by the relative position of the lifting cylinders 30, 32. By this arrangement, a portion of the load on the rear wheels 12 of the tractor is transferred forwardly to the front wheels 10 of the tractor effecting a redistribution therebetween. Similarly, when the dump box 22 is in the raised position as shown in phantom in FIGURE 1 and it is desired to remove a portion of the load from the front wheels 10 to the rear wheels 12 of the tractor, the lifting pad 38 can be lowered by retracting the lifting cylinders 30, 32 whereby the load concentration on the tractor imposed by the semitrailer is shifted rearwardly to the fifth wheel assembly 14.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a tractor having front and rear wheels and including a frame having a fifth wheel thereon, and a dump type semitrailer having rear wheels and including a framework connected at the forward portion to the fifth wheel and a dump box supported on the framework and hingedly connected thereto at a rearward portion thereof, the improvement comprising a load distribution mechanism for shifting a portion of the load to and from the front and rear wheels of the tractor, said mechanism comprising lift means on the tractor disposed intermediate the front and rear wheels thereof forward of the fifth wheel and movable to and from a lowered position and a raised position, said lift means when moved to said raised position coacting with a forward projection on the dump box to pivot and raise the dump box off the framework and movably support the dump box in the raised position enabling relative pivoting movement of the framework on the fifth wheel and movement of the dump box relative to said lift means whereby a substantial portion of the load is transferred from the fifth wheel to said lift means causing a shift of load from the rear to the front wheels of the tractor, said lift means disposed out of contact with the dump box when in said lowered position, and inter-engageable means on said tractor and said trailer operable when inter-engaged to effect de-energization of said lift means upon the pivoting of said tractor with respect to said trailer beyond a preselected angularity.

2. In a tractor having front and rear wheels and including a frame having a fifth wheel thereon, and a dump type semitrailer having rear wheels and including a framework connected at the forward portion thereof to the fifth wheel and a dump box supported on the framework and hingedly connected thereto at a rearward portion thereof, the improvement comprising a load distribution mechanism for shifting a portion of the load to and from the front and rear wheels of the tractor, said mechanism comprising a jack mounted on the tractor frame forwardly of the fifth wheel and intermediate the front and rear wheels of the tractor, said jack including a lift member movable to and from a lowered position and a raised position and disposed below a forward projection on the dump box of the semitrailer, said lift member when in said lowered position disposed out of contact with the forward projection, said lift member when moved to the raised position slidably contacting the forward projection and lifting and pivoting the dump box off the framework providing for relative pivoting movement of the framework on the fifth wheel and movement of the dump box relative to said lift member while in said raised position whereby a substantial portion of the load is transferred from the fifth wheel to said jack causing a shift of load from the rear to the front wheels of the tractor, and inter-engageable means on said tractor and said trailer operable when inter-engaged to effect de-energization and re-energization of said jack upon the pivoting of said tractor with respect to said trailer beyond a preselected angularity.

3. In a tractor vehicle having front and rear wheels and including a frame having a fifth wheel thereon, and a dump type semitrailer vehicle having rear wheels and including a framework connected at the forward portion thereof to the fifth wheel and a dump box supported on the framework and hingedly connected thereto at a rearward portion thereof, the improvement comprising a load distribution mechanism for shifting a portion of the load to and from the front and rear wheels of the tractor, said mechanism comprising a fluid actuated cylinder mounted on the tractor frame forwardly of the fifth wheel and intermediate the front and rear wheels of the tractor, said cylinder including a slidably disposed reciprocable piston rod, a lifting pad affixed to the end of said rod and reciprocable thereby to and from a lowered position and a raised position, said lifting pad when in said lowered position disposed below and out of contact with a forward projection on the dump box of the trailer, said lifting pad when moved to said raised position slidably contacting the forward projection and lifting and pivoting the dump box off the trailer framework providing for relative pivoting movement of the framework on the fifth wheel and movement of the dump box relative to said lifting pad when in said raised position whereby a substantial portion of the load is transferred from the fifth wheel to said cylinder causing a shift of the load from the rear to the front wheels of the tractor, and control means including coacting means on said tractor and said trailer operable when coacting to effect de-energization and re-energization of said fluid actuated cylinder upon the pivoting of said tractor with respect to said trailer beyond a preselected angularity.

4. A load distribution mechanism as descrbed in claim 3 wherein said coacting means comprises sensing means on one of said vehicles and tripping means on the other of said vehicles mounted for relative angular movement corresponding to the pivotal movement between said vehicles, said sensing means operable in response to actuation by said tripping means to signal said control means for de-energization and re-energization of said fluid actuated lift cylinders.

5. In a tractor vehicle having front and rear wheels and including a frame having a fifth wheel thereon, and a dump type semitrailer vehicle having rear wheels and including a framework connected at the forward portion thereof to the fifth wheel and a dump box supported on the framework and hingedly connected thereto at a rearward portion thereof, the improvement comprising a load distribution mechanism for shifting a portion of the load to and from the front and rear wheels of the tractor, said mechanism comprising a pair of hydraulically actuated cylinders disposed in spaced transverse relationship and mounted on the tractor frame forwardly of the fifth wheel and intermediate the front and rear wheels thereof, each of said cylinders including a piston and rod assembly slidably disposed and reciprocable therein, a lifting pad extending between and affixed to the ends of each of said piston and rod assemblies and reciprocable thereby to and from a lowered position and a raised position, said lifting pad when disposed in said lowered position disposed below and out of contact with a pressure pad affixed to a forward projecting portion of the dump box on the semitrailer, said lifting pad when moved to said raised position disposed to slidably contact said pressure pad for lifting and pivoting the dump box off the semitrailer framework, and providing for relative pivoting movement of the framework on the fifth wheel and relative movement between said pressure pad and said lifting pad when in said raised position whereby a substantial portion of the load is transferred from the fifth wheel to said hydraulic cylinders causing a shift of a portion of the load from the rear wheels to the front wheels of the tractor, coacting means including a pair of transversely disposed limit switches on one of said vehicles and tripping means on the other of said vehicles mounted for relative angular movement corresponding to the pivoting of said tractor with respect to said trailer, said limit switches operable in response to actuation by said tripping means to effect de-energization and re-energization of said hydraulically actuated cylinders.

6. In the load distribution mechanism described in claim 5 wherein said limit switches are angularly adjustable.

References Cited in the file of this patent

UNITED STATES PATENTS

| | | |
|---|---|---|
| 2,847,230 | Hendrickson et al. | Aug. 12, 1958 |
| 2,941,818 | Hubbard | June 21, 1960 |
| 3,073,623 | Owen | Jan. 15, 1963 |

FOREIGN PATENTS

| | | |
|---|---|---|
| 215,748 | Australia | Aug. 15, 1957 |